May 30, 1939.　　　　　S. P. MORSE　　　　　2,160,388
FRUIT JUICE EXTRACTING AND STRAINING APPLIANCE
Filed March 5, 1936　　　　2 Sheets-Sheet 1

INVENTOR
Shirley P. Morse,
BY
ATTORNEY

May 30, 1939.  S. P. MORSE  2,160,388
FRUIT JUICE EXTRACTING AND STRAINING APPLIANCE
Filed March 5, 1936  2 Sheets—Sheet 2
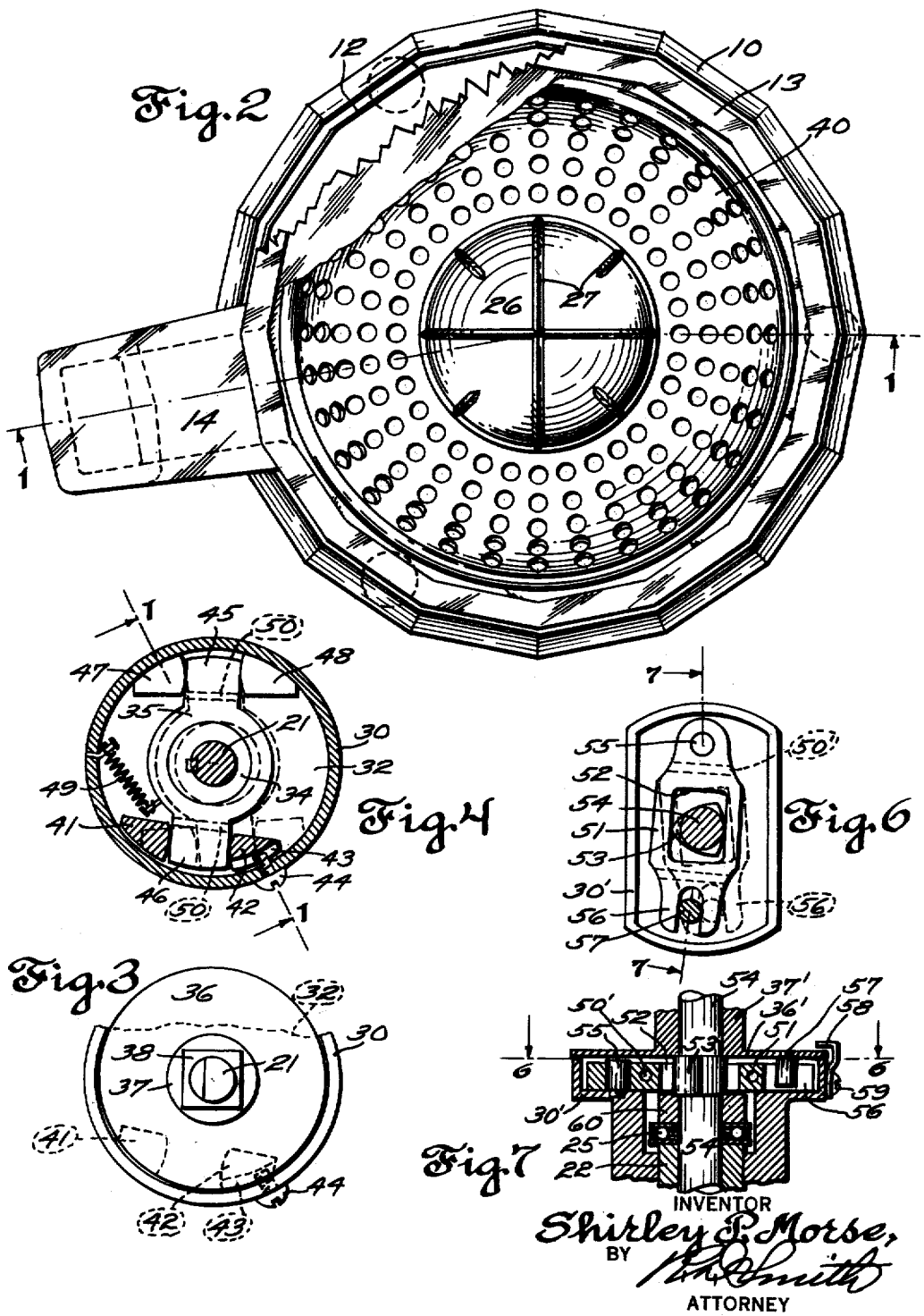
INVENTOR
Shirley P. Morse,
BY
ATTORNEY Patented May 30, 1939

2,160,388

UNITED STATES PATENT OFFICE 2,160,388

FRUIT JUICE EXTRACTING AND STRAINING APPLIANCE

Shirley P. Morse, East Haven, Conn., assignor to The A. C. Gilbert Company, New Haven, Conn., a corporation of Maryland Application March 5, 1936, Serial No. 67,246

18 Claims. (Cl. 146—3)

This invention relates to fruit juice extracting and straining appliances and to improved mechanism by which the extracting and straining parts of such appliances may be motivated. In some respects the present invention concerns improvements in the type of fruit juice extractor disclosed in United States Patent No. 1,914,888, granted June 20, 1933, to A. C. Gilbert.

One object of the invention is to provide an improved form of removably mounted strainer positioned to catch the fruit fibers, seeds, pulp and juice as they are reamed out of a half orange, lemon or other citrous fruit by a rotating reamer or other form of juice extractor, and to impart smart and abrupt oscillatory movements to such strainer for effectively agitating the extracted fruit substances caught by the strainer, so that more of the fruit juices and usable finer portions of the fruit pulp shall be caused to pass through the strainer than is possible where an undisturbed collection of fruit substances accumulates in a stationary, or sluggishly motivated, strainer.

Another object is to provide a rugged and compact mechanism of few parts for converting rotative motion into oscillatory motion to be imparted to the strainer for causing the latter to oscillate effectively for the purpose stated.

Other objects are to provide such movement converting mechanism in the form of a compact unit preferably housed in a lubricant retaining chamber through which the drive shaft for the fruit reamer may extend; also to prevent objectionable displacement of the lubricant to non-lubricating positions in such chamber, and also to reduce the noise of reciprocating parts by introducing resilient means normally arranged to take up lost motion or backlash therebetween.

A further object is to provide a movement converting mechanism which, to increase the rapidity of oscillation of the strainer, may cause the strainer to perform more than one cycle of back-and-forth oscillatory movement while the extractor is completing a single revolution thereby more vigorously to agitate the strainer-contained fruit substances.

A still further object is to so construct a combined juice extracting and straining appliance that the working parts which actually perform the extracting and the straining, as well as the bowl which catches the strained portion of the juices and pulp, may all readily be removed and replaced for the purpose of cleaning and without the use of any tools. It is also an object to construct and arrange these working parts so that the extracted juice will be prevented from gaining access to the interior mechanism which motivates the working parts.

The above and other objects will be apparent from the following description and appended drawings, wherein:

Fig. 1 is a side elevation of a complete juice extracting and straining appliance embodying constructions illustrative of the invention and in which the uppermost parts are shown to be sectioned on the planes 1—1 in Fig. 2, and the power transmitting and movement converting mechanism sectioned on the plane 1—1 in Fig. 4, the casing of the appliance being partly broken away better to illustrate the above and certain other features of the construction.

Fig. 2 is a plan view of the appliance showing the strainer and the juice receiving bowl partly broken away.

Fig. 3 is a plan view of the motivating mechanism with the extractor, strainer and catch bowl removed, the cam compartment housing being partly broken away.

Fig. 4 is a plan view of the mechanism in the cam chamber and is taken in section on the plane 4—4 in Fig. 1, the parts being shown on a somewhat enlarged scale.

Fig. 6 shows a modification of the cam and oscillator mechanism for imparting a more rapid movement to the strainer; parts being sectioned on the plane 6—6 in Fig. 7.

Fig. 7 is a side view of the mechanism in Fig. 6 taken in section on the planes 7—7 in Fig. 6.

Figure 1:
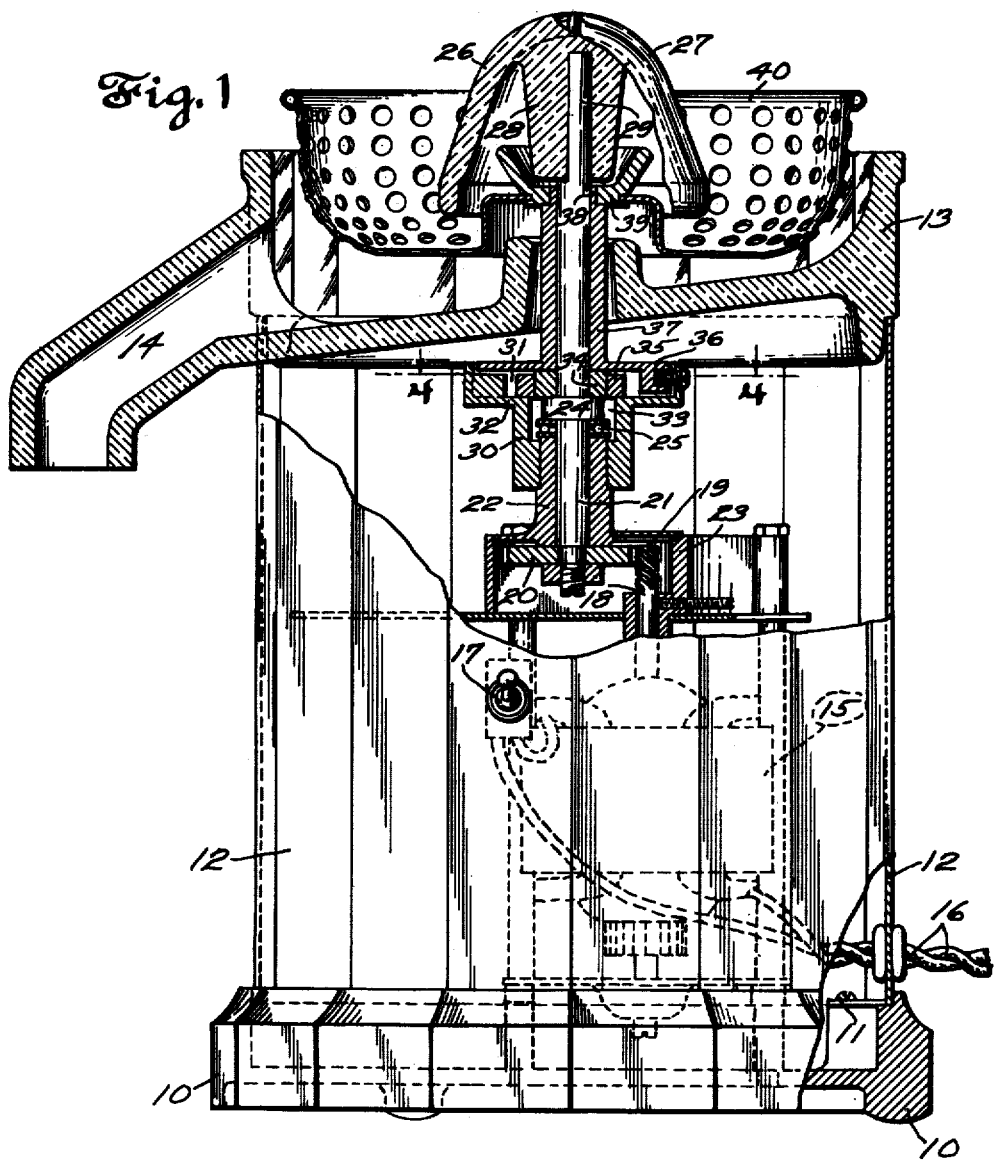

In Fig. 1 and Fig. 2 the appliance base 10 carries, removably secured to it by screws 11, the housing shell 12 which is open at the top to receive the catch bowl 13 having the spout 14 for discharging the fruit juices which have been extracted and strained.

Within the housing 12 any suitable motor 15 may be mounted and furnished with electric current through the attachment cord wires 16, the electric control switch 17 being connected in series with the motor. At its upper end the motor shaft 18 may be provided with gear teeth 19 meshing with the teeth of a larger gear 20 secured fast to the lower end of the vertical shaft 21 which extends upwardly through an extended bearing sleeve 22 provided upon the gear housing 23. The construction of this housing and its contained reduction gearing may be similar to that disclosed in the aforesaid Patent No. 1,914,888, to A. C. Gilbert.

A thrust collar 24 is rigid with shaft 21 and rests upon a ball bearing 25 designed to take the downward thrust of the fruit upon the extractor dome 26 which is ribbed at 27 for reaming the interior of the fruit skin and whose hub 28 may be recessed to fit a flatted upper terminal 29 of shaft 21 so that the extractor 26 will be positively rotated by shaft 21 and readily removable from the end thereof.

Figure 5:
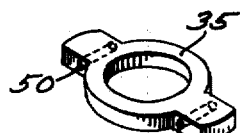
Fig. 5 is a perspective view of the cam actuated oscillator bar.

Externally mounted upon the bearing sleeve 22 and rigid therewith is a cup shaped housing 30 providing a shallow cam chamber 31 formed by a floor wall 32 of the housing 30 and central of which a well 33 provides room for the ball bearing 25 and the shaft collar 24, above which collar shaft 21 fixedly carries a cam 34 best shown in Figs. 1 and 4. Surrounding cam 34 in a common plane therewith, the oscillator bar 35, shown detached in Fig. 5, is adapted to rest and slide upon the floor wall 32 to act as a follower for the rotative movement of the eccentric cam 34.

Resting in freely rotative relation upon cam 34 is the flange 36 fixed with the bottom end of a hollow shaft 37 which surrounds the extractor shaft 21 and is free to rotate as a sleeve thereon. The top end of the hollow shaft 37 is flatted or squared at 38 to receive and support the cup shaped hub 39 of a perforated strainer cup 40 which latter will thereby be supported to oscillate with the hollow shaft 37 while free at all times to be lifted off from the upper squared end 38 thereof and as readily replaced, and without the use of tools. Projecting downwardly from its under surface, the flange 36 carries two lugs 41 and 42, the latter of which is provided with a peripheral groove 43 which may be loosely engaged by a withdrawable retaining screw 44 having threaded engagement with the cup housing 30 and which in no way interferes with the free oscillatory movement of flange 36, but prevents the hollow shaft 34 from being lifted by any cling between it and the strainer hub 39 when the latter is taken off for cleaning. The inverted conical shape given to the strainer hub 39 provides a convenient fingerhold for removing and replacing it upon the squared end 38 of hollow shaft 37.

One end 45 of the oscillator 35 is interposed between convex surfaces of the two lugs 41 and 42 while the opposite end 46 of the oscillator is correspondingly interposed between convex surfaces of two lugs 47 and 48 which are rigid with the cup housing 30. One or more springs 49 may or may not be employed to connect the housing 30 with the oscillator 35 for taking up any lost motion that may exist in the fit of the oscillator ends 45 and 46 with respect to the space between the abutments which they engage.

The operation of the mechanism thus far described is as follows. When the switch 17 is snapped "on", motor 15 will continuously drive the extractor shaft 21 and thereby the cam or eccentric 34 in a constant direction. As the cam 34 rotates its eccentric movement is followed by the oscillator 35 which surrounds it to the extent of the effective eccentricity of the cam, which is a distance equal to twice the differential between the minimum and maximum radii of the cam; but as the end 46 of the oscillator is kept from rotating by the lugs 47 and 48, the opposite end 45 of the oscillator is caused to perform a reciprocative swinging movement of greater linear extent than the effective eccentricity of the cam, thus multiplying the amount of oscillatory movement imparted to the strainer by a cam of given eccentricity through the engagement of the oscillator end 45 with the lugs 41 and 42 movable with the hollow strainer shaft 37. It will be observed that the oscillator 35 is also caused to perform a lengthwise sliding movement between the lugs 41, 42 and 47, 48 which it free to do because of the clearance between each of its ends and the housing 30. A spring such as 49, if employed, will constantly urge the oscillator clockwise and may to some extent act as a silencer by taking up backlash in the reciprocative movement of the parts. In practice it will be feasible to pack the cam chamber 31 with a light grease which will lubricate all of the parts therein and also the ball bearing 25. Suitable passages 50, which if preferred may be in the form of grooves, will give fluid communication from one side to the other side of the oscillator to reduce the tendency of lubricating grease to pack at either side of the oscillator.

Figs. 6 and 7 illustrate a modification of the movement converting mechanism of Figs. 1 and 4 which may be resorted to for increasing the number of oscillations of the strainer corresponding to one revolution of the extractor dome. Here, the oscillator 51 takes the form of a diametrically extending lever having the central aperture 52 whose sides are engaged by the three cornered cam 53 fast to the extractor shaft 54 which may replace the shaft 21 in the appliance of Figs. 1 and 2. The cam 53 will cause three oscillations of the lever 51 for each revolution of shaft 54, lever 51 being swingable upon a pivot pin 55 fast in the housing 30' and having a forked end 56 engaging a pin 57 carried by the flange of the hollow strainer shaft 37' which flange 36' may be prevented from lifting by a hook shaped retaining clip 58 secured to the housing 30' by a screw 59. It will be observed that because of the smallness of the three cornered cam 53, this cam may be integral with the metal of the shaft 54 and rest upon a thrust collar 60 interposed between it and the ball bearing 25. In the modification of Figs. 6 and 7 the cam housing 30' is shown to be reduced in size and of course the cam housing 30 of Fig. 4 could correspondingly be made smaller. A spring, equivalent in function to the spring 49 of Fig. 4 may be introduced at any appropriate point in the mechanism of Fig. 6 to take up backlash if silencing is needed due to the wear of parts or other causes. For instance, any one of the abutments or lugs, 41, 42, 47 or 48, may be recessed to receive one end of a short coiled compression spring the other end of which may seat within a corresponding or registering recess in the side of the oscillator bar 35. Two holes like 50' may provide passageways for lubricant through the body of oscillator 51 as do the holes 50 in Fig. 4.

Without intent to limit the scope of my claims to any more definite constructions than all fair equivalents of the constructions herein illustrated and described to explain the invention, I claim:

1. In combination with a rotatable fruit reamer, an associated strainer cup disposed to catch substances extracted from the fruit by said reamer, a drive shaft for rotating said extractor and extending downwardly therefrom, a cam rotatively fixed on said drive shaft, a hollow shaft for transmitting oscillatory movement to said strainer cup extending downwardly therefrom and having a lower end surrounding said drive shaft, engageable means carried by said hollow shaft near its said lower end, and an oscillator arranged to be operated by said cam and having an aperture occupied thereby, said oscillator operatively engaging said means to cause oscillation of said hollow shaft thereby to oscillate the strainer cup.

2. In combination with a rotatable fruit reamer, an associated strainer cup disposed to catch substances extracted from the fruit by said reamer, a drive shaft for rotating said extractor extending downwardly therefrom, a cam rotative with said drive shaft, a hollow shaft for impelling said strainer cup extending downwardly therefrom and surrounding said drive shaft, engageable means revoluble with said hollow shaft, and a perforate oscillator constrained for swinging movement at one of its ends and operatively engaging with said means at its opposite end and disposed to surround and be actuated by said cam at its portion intermediate said ends.

3. In a fruit juice extracting and straining appliance, in combination with a vertical power shaft having a flatted upper end, a strainer cup embodying a perforated and dished receptacle formed from sheet metal to a shape providing an upwardly cupped formation in the floor wall of the receptacle having a central aperture, and a mounting hub of inverted conical shape securely fastened in said aperture and projecting thereabove to afford a convenient finger grasp for manipulating the strainer cup, said hub having a flat sided aperture for removably mounting the strainer cup upon the flatted end of said power shaft to be supported and rotatively impelled thereby.

4. In a fruit juice extracting and straining appliance including a rotatable juice extractor and an oscillatory juice strainer, the combination with concentrically related vertical shafts respectively carrying the extractor and carrying the strainer in underlying relation thereto, of a lever-like motion transmitter having an oscillatory end portion impellingly related to the strainer carrying shaft, stationary means arranged to engage with a different end portion of said transmitter in a manner pivotally to constrain the latter, and an eccentric actuator constructed and arranged to be rotated by the extractor carrying shaft and to act upon said transmitter at a point intermediate its said pivotally constrained end portion and its said oscillatory end portion thereby to cause the transmitter to swing back and forth about its pivotally constrained end portion and cause the oscillatory end portion to travel through a distance greater than the effective eccentricity of said actuator.

5. In a fruit juice extracting and straining appliance as described in claim 4, the combination therein described together with a bearing structure arranged cooperatively with the said extractor carrying shaft to surround, support and guide the latter in vertical position, and a cup-shaped chamber housing rigid with said bearing structure and encompassing the said transmitter and the said eccentric actuator thereby to afford a liquid tight container for retaining lubricant about and between the last said parts.

6. In a fruit juice extracting and straining appliance as described in claim 4, the combination therein described wherein the said motion transmitter comprises a substantially straight bar disposed horizontally in diametral relation to both of the said shafts and has a longitudinally extending aperture, and the said eccentric actuator comprises a cam rotatively fixed on the said extractor carrying shaft and occupying said aperture, and the said stationary means comprises abutments spaced in the plane of movement of said transmitter and shaped and disposed to engage with respectively opposite edges of the said different end portion of the transmitter in a manner pivotally to constrain and to permit longitudinal movement of the transmitter.

7. In a fruit juice extracting and straining appliance as described in claim 4, the combination therein described together with a spring connected and arranged in relation to the said transmitter and the said strainer carrying shaft to take up lost motion therebetween for silencing their cooperative action.

8. In a fruit juice extracting and straining appliance as described in claim 4, the combination therein described together with a bearing structure arranged cooperatively with the said extractor carrying shaft to surround, support and guide the latter in vertical position, and a cup-shaped chamber housing rigidly joined to said bearing structure and closely encompassing both of the said end portions of the said transmitter and also encompassing the said eccentric actuator and constructed to form a liquid tight container for lubricant, the transmitter having a portion of its body cut away to afford passageway for the said lubricant from one side of the transmitter to the other side thereof within said housing.

9. In a fruit juice extracting and straining appliance as described in claim 4, the combination therein described in which the said stationary means comprises abutments spaced apart in the plane of movement of the said transmitter and flanking opposite sides of the said different end portion of the transmitter thereby pivotally to constrain the latter.

10. In a fruit juice extracting and straining appliance as described in claim 4, the combination therein described in which the said eccentric actuator comprises a cam rotatively fixed on the said extractor carrying shaft and having an eccentric periphery, and the said motion transmitter contains an aperture occupied by said cam and operatively engaged by the periphery thereof and elongated in a direction aligned with the said pivotally constrained end portion and the said oscillatory end portion of the transmitter.

11. In a fruit juice extractor and straining appliance as described in claim 4, the combination therein described in which the said eccentric actuator comprises a cam rotatively fixed on the said extractor carrying shaft and having a periphery shaped to provide a plurality of eccentric radial projections acting upon the said transmitter in a manner to cause a plurality of oscillatory excursions of the strainer simultaneously with each revolution of the extractor carrying shaft.

12. In a fruit juice extracting and straining appliance in combination, a motor having a stator body at a relatively low level in said appliance, a rotary juice extractor spaced above said stator body, a motor driven shaft extending upwardly from the stator body to the extractor to rotate the latter in a constant direction, an oscillatory juice strainer operatively supported at a level between said stator body and said extractor, a strainer oscillating shaft having an axis extending in a direction like that of the extractor shaft, and movement transmitting mechanism operating between said shafts in planes transverse the axes thereof intermediate the levels of said stator body and said extractor constructed and arranged to convert rotary movement of the extractor shaft into oscillatory movement of the strainer shaft.

13. In a fruit juice extracting and straining appliance, the combination set forth in claim 12 in which the said movement transmitting mechanism includes devices constructed and arranged to cause the strainer shaft to perform a plurality of cycles of oscillatory movement while the said extractor shaft is performing a single revolution.

14. In a fruit juice extracting and straining appliance, the combination set forth in claim 12 in which the said movement transmitting mechanism includes devices constructed and arranged to transmit a positive drive to the said strainer shaft in alternately reverse directions in a manner to cause said strainer to perform a plurality of cycles of oscillatory movement while said extractor is performing a single revolution.

15. In a fruit juice extracting and straining appliance in combination, a motor mounted at a relatively low level in said appliance, a rotary juice extractor spaced above said motor, a motor driven shaft extending from the motor upwardly to said extractor for rotating the latter in a constant direction, an oscillatory juice strainer supported for operation below said extractor, an actuator carried by said shaft between said motor and said strainer, and a power transmitting device mounted to reciprocate in a plane transverse the axis of said shaft intermediate the ends of said shaft and constructed and arranged to convert rotary movement of said actuator into oscillatory movement of said strainer.

16. In a fruit juice extracting and straining appliance, the combination set forth in claim 15 in which the said actuator and power transmitting device are cooperatively constructed and arranged to cause the strainer to perform a plurality of cycles of oscillatory movement while the said motor driven shaft is performing a single revolution.

17. In a fruit juice extracting and straining appliance, the combination set forth in claim 15 in which the said actuator and power transmitting device are cooperatively constructed and arranged to transmit a positive drive to the said strainer in alternately reverse directions in a manner to cause said strainer to perform a plurality of cycles of oscillatory movement while the said extractor is performing a single revolution.

18. The combination defined in claim 1 together with a stationary frame abutment, and a spring connecting the said oscillator to said abutment in a manner yieldingly to urge said oscillator constantly in one rotative direction thereby to reduce lost motion of said oscillator relative to the said means engageable thereby for oscillating the said hollow shaft.

SHIRLEY P. MORSE.

CERTIFICATE OF CORRECTION.

Patent No. 2,160,388.　　　　　　　　　　　　May 30, 1939.

SHIRLEY P. MORSE.

It is hereby certified that error appears in the printed specification of the above numbered patent requiring correction as follows: Page 2, second column, line 8, after the word "it" insert is; page 3, second column, line 73, claim 12, for "uponwardly" read upwardly; and that the said Letters Patent should be read with this correction therein that the same may conform to the record of the case in the Patent Office.

Signed and sealed this 4th day of July, A. D. 1939.

Henry Van Arsdale (Seal)　　　　　　　　　　　　　　　　　Acting Commissioner of Patents.

juice strainer operatively supported at a level between said stator body and said extractor, a strainer oscillating shaft having an axis extending in a direction like that of the extractor shaft, and movement transmitting mechanism operating between said shafts in planes transverse the axes thereof intermediate the levels of said stator body and said extractor constructed and arranged to convert rotary movement of the extractor shaft into oscillatory movement of the strainer shaft.

13. In a fruit juice extracting and straining appliance, the combination set forth in claim 12 in which the said movement transmitting mechanism includes devices constructed and arranged to cause the strainer shaft to perform a plurality of cycles of oscillatory movement while the said extractor shaft is performing a single revolution.

14. In a fruit juice extracting and straining appliance, the combination set forth in claim 12 in which the said movement transmitting mechanism includes devices constructed and arranged to transmit a positive drive to the said strainer shaft in alternately reverse directions in a manner to cause said strainer to perform a plurality of cycles of oscillatory movement while said extractor is performing a single revolution.

15. In a fruit juice extracting and straining appliance in combination, a motor mounted at a relatively low level in said appliance, a rotary juice extractor spaced above said motor, a motor driven shaft extending from the motor upwardly to said extractor for rotating the latter in a constant direction, an oscillatory juice strainer supported for operation below said extractor, an actuator carried by said shaft between said motor and said strainer, and a power transmitting device mounted to reciprocate in a plane transverse the axis of said shaft intermediate the ends of said shaft and constructed and arranged to convert rotary movement of said actuator into oscillatory movement of said strainer.

16. In a fruit juice extracting and straining appliance, the combination set forth in claim 15 in which the said actuator and power transmitting device are cooperatively constructed and arranged to cause the strainer to perform a plurality of cycles of oscillatory movement while the said motor driven shaft is performing a single revolution.

17. In a fruit juice extracting and straining appliance, the combination set forth in claim 15 in which the said actuator and power transmitting device are cooperatively constructed and arranged to transmit a positive drive to the said strainer in alternately reverse directions in a manner to cause said strainer to perform a plurality of cycles of oscillatory movement while the said extractor is performing a single revolution.

18. The combination defined in claim 1 together with a stationary frame abutment, and a spring connecting the said oscillator to said abutment in a manner yieldingly to urge said oscillator constantly in one rotative direction thereby to reduce lost motion of said oscillator relative to the said means engageable thereby for oscillating the said hollow shaft.

SHIRLEY P. MORSE.

CERTIFICATE OF CORRECTION.

Patent No. 2,160,388. May 30, 1939.

SHIRLEY P. MORSE.

It is hereby certified that error appears in the printed specification of the above numbered patent requiring correction as follows: Page 2, second column, line 8, after the word "it" insert is; page 3, second column, line 73, claim 12, for "uponwardly" read upwardly; and that the said Letters Patent should be read with this correction therein that the same may conform to the record of the case in the Patent Office.

Signed and sealed this 4th day of July, A. D. 1939.

Henry Van Arsdale (Seal)

Acting Commissioner of Patents.

DISCLAIMER 2,160,388.—*Shirley P. Morse*, East Haven, Conn. FRUIT JUICE EXTRACTING AND STRAINING APPLIANCE. Patent dated May 30, 1939. Disclaimer filed December 24, 1940, by the assignee, *California Fruit Growers Exchange*.
Hereby enters this disclaimer to claim 15 in said specification.
[*Official Gazette January 21, 1941.*]